(12) United States Patent
Hamersley et al.

(10) Patent No.: US 10,121,509 B2
(45) Date of Patent: Nov. 6, 2018

(54) OPTICAL DISC AUTHENTICATION BY INTERFEROMETRIC FINGERPRINTING

(71) Applicant: THOMSON LICENSING, Issy les Moulineaux (FR)

(72) Inventors: Alan Bruce Hamersley, Newbury Park, CA (US); John Matthew Town, Ojai, CA (US); Holger Hofmann, Ingelheim (DE)

(73) Assignee: Thomson Licensing, ssy les Moulineaux (FR)

( * ) Notice: Subject to any disclaimer, the term of this patent is extended or adjusted under 35 U.S.C. 154(b) by 93 days.

(21) Appl. No.: 15/124,268

(22) PCT Filed: Feb. 23, 2015

(86) PCT No.: PCT/US2015/017070
§ 371 (c)(1),
(2) Date: Sep. 7, 2016

(87) PCT Pub. No.: WO2015/134218
PCT Pub. Date: Sep. 11, 2015

(65) Prior Publication Data
US 2017/0148480 A1 May 25, 2017

Related U.S. Application Data

(60) Provisional application No. 61/949,994, filed on Mar. 7, 2014.

(51) Int. Cl.
*H04N 9/80* (2006.01)
*G06F 17/30* (2006.01)
*H04N 7/16* (2011.01)
*G06F 7/04* (2006.01)
*G11B 20/00* (2006.01)

(52) U.S. Cl.
CPC .............. *G11B 20/00123* (2013.01)

(58) Field of Classification Search
USPC .................................................. 386/252–260
See application file for complete search history.

(56) References Cited

U.S. PATENT DOCUMENTS

| 8,497,983 B2 | 7/2013 | Cowburn et al. |
| 8,555,076 B2 | 10/2013 | Benedikt |
| 2008/0238082 A1* | 10/2008 | Vast ................ B42D 25/29 283/72 |

(Continued)

FOREIGN PATENT DOCUMENTS

| WO | WO2004072782 | 8/2004 |
| WO | WO2006064412 | 6/2006 |

OTHER PUBLICATIONS

Potlapally, "Optical Figerprinting to Protect Data: A Proposal," IEEE Computer Society, vol. 35, No. 3, Apr. 2002, pp. 23-28.

(Continued)

*Primary Examiner* — Hung Dang
(74) *Attorney, Agent, or Firm* — Vincent E. Duffy

(57) ABSTRACT

Authentication of discs occurs by the use of interferometric authentication data. Such authentication data of a data disc is generated based on an interference pattern associated with thickness variations of a material layer on the disc. The interference pattern represents a unique fingerprint that can be used for authentication of individual discs.

14 Claims, 16 Drawing Sheets

(56) References Cited

U.S. PATENT DOCUMENTS

2010/0208314 A1* 8/2010 Shirakura ............ G03H 1/0011
359/3
2011/0002209 A1 1/2011 Darko et al.

OTHER PUBLICATIONS

Hammouri et al., "CDs Have Fingerprints Too", 11th International Workshop on Cryptographic Hardware and Embedded Systems, Lausanne, Switzerland, Sep. 6, 2009, pp. 1-15.

* cited by examiner

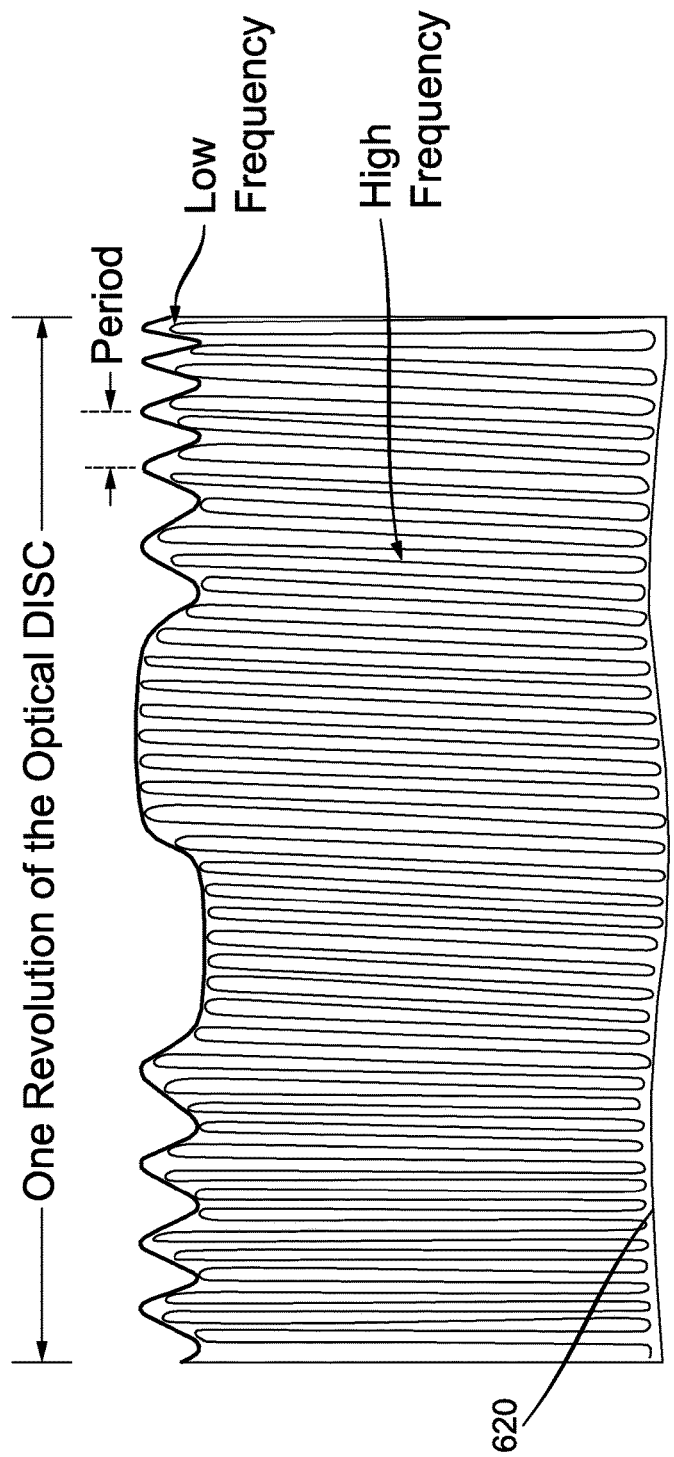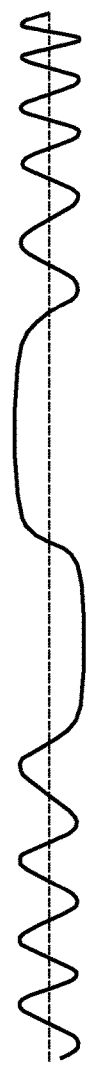
FIG. 6A
FIG. 6B

OPTICAL DISC AUTHENTICATION BY INTERFEROMETRIC FINGERPRINTING

CROSS-REFERENCE TO RELATED APPLICATIONS

This application claims the benefit, under 35 U.S.C. § 365 of International Application of PCT/US15/017070, filed Feb. 23, 2015, which was published in accordance with PCT Article 21(2) on Sep. 11, 2015, in English, and which claims the benefit of United States Provisional Application No. 61/949,994, filed Mar. 7, 2014.

TECHNICAL FIELD

This invention relates to a method and apparatus for data disc authentication using an interferometric technique, and a data disc having interferometric authentication data stored thereon.

BACKGROUND ART

In the pre-recorded optical disc industry, there exists a need to uniquely identify each replicated disc. For example, a unique characteristic or set of unique characteristics for each replicated disc can be used for disc authentication, anti-piracy, and/or anti-counterfeiting purposes. Traditionally, the data on each manufactured disc remains inherently identical to other discs for the same content because each disc is a molded replica from the same master or stamper. Present methods for uniquely fingerprinting individual discs have involved physically marking or damaging the disc by laser or other means. Other methods include measuring the angular orientation of layers randomly placed on the optical disc during manufacturing. Alternatively, unique disc identification can occur by determining locations of randomly created manufacturing defects and using the created or determined information to uniquely identify each disc. However, these methods rely on a very limited amount of unique information for authentication purposes and their effectiveness can be significantly reduced if the underlying principles of the methods become known.

Thus a need exists for an improved disc identification technique that overcomes the disadvantages of the prior art.

BRIEF SUMMARY

In accordance with an aspect of the present principles, a method for authenticating optical discs includes directing light through a light-transmissive first surface of the disc surface towards at least a first data layer. An optical interference pattern is detected that arises from light reflected from the first data layer interfering with light reflected from at least one of the first disc surface and a second data layer. The disc can be authenticated based on the detected optical interference pattern.

In accordance with another aspect of the present principles, a method of providing a disc with authentication data includes: detecting an optical interference pattern arising from light reflected from a first data layer interfering with light reflected from at least one of a disc surface and a second data layer on the disc; deriving authentication data from the measured optical interference pattern; and writing the authentication data on the disc.

In accordance with yet another aspect of the present principles, a data disc includes: (a) a first disc surface, (b) first data layer; and (c) authentication data stored on the disc, wherein the authentication data relates to at least one optical interference pattern arising from light reflected from the first data layer interfering with light reflected from at least one of: the first disc surface and a second data layer.

In accordance with a further embodiment of the present principles, an apparatus, includes a photodetector configured for detecting light signals reflected from a data disc; and at least one processor configured for processing the detected light signals and generating data based on light intensity modulations arising from light reflected from a first data layer interfering with light reflected from at least one of a read-out surface and a second data layer of the data disc. The at least one processor performs at least one of storing the generated data for use as authentication data for the data disc, and comparing the generated data with predetermined authentication data for authenticating the data disc.

BRIEF DESCRIPTION OF THE DRAWINGS

The teachings of the present principles can be readily understood by considering the following detailed description in conjunction with the accompanying drawings, in which:

FIG. 6a illustrates a readout signal obtained in one revolution of an optical disc.

FIG. 6b illustrates an example of an interferometric fingerprint signal obtained by applying a low pass filter to the signal of FIG. 6a.

To facilitate understanding, identical reference numerals serve to designate identical elements common to different figures. The drawings are not to scale, and one or more features may be expanded or reduced for clarity.

DETAILED DESCRIPTION

In accordance with the present principles, a method and apparatus enables authentication of optical discs such as pre-recorded and recordable Blu-ray Discs (BD), Digital Versatile Discs (DVD) and other recordable discs, based on unique physical characteristics of the discs. In the context of the present principles, the terms disc, optical or data disc, and optical medium, are considered interchangeable. In one embodiment, a fingerprint unique to an optical disc is created based on variations in a material layer's thickness, which result from the optical disc replication process for dual layer optical media such as those specified for BD and DVD. Both the BD and DVD standards define a two data layer or dual layer disc in their respective specifications (BD molded/embossed and DVD molded/molded). Due to large data storage requirements, the vast majority of BD and DVD media are produced in the dual layer format in accordance with the BD and DVD specifications, respectively.

Certain random and unique features created during the disc replication process can result in one or more physical characteristics that are unique to each replicated disc. This unique characteristic of each disc can be read and captured after the replication process and employed to create a unique digital identifier (e.g., fingerprint) uniquely identifying unique disc. This unique digital identifier can be written to a recordable region of the pre-recorded disc, or can be recorded using a standard laser scribing technique called Burst Cutting Area (BCA) or can be written to an ancillary data storage device. This identification technique exhibits a very high degree of robustness against handling and environmentally introduced deterioration of the disc. This technique advantageously enables optical disc authentication (based on the unique fingerprint) by an optical disc playback device prior to allowing playback on an optical disc drive or playback system.

Figure 1A:
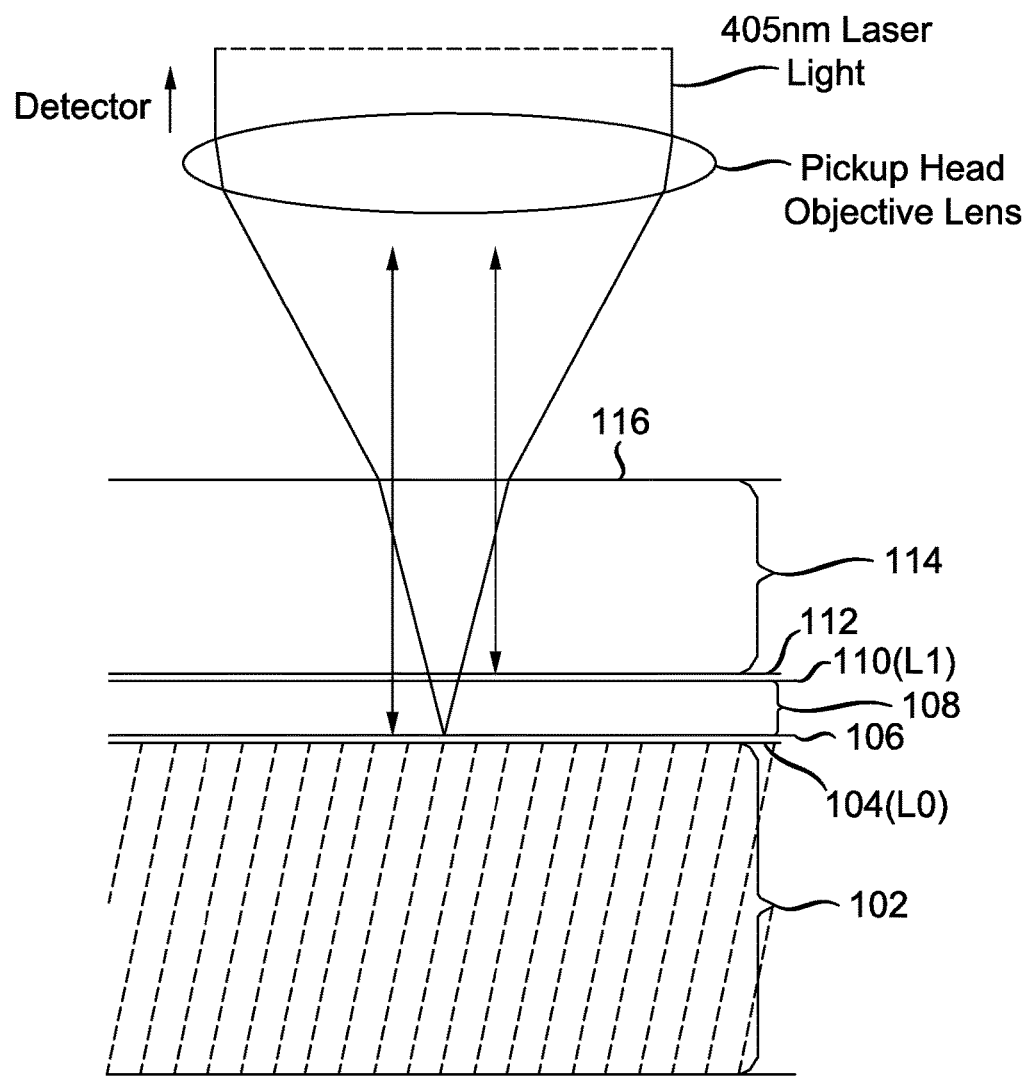
FIG. 1a illustrates a first embodiment of the present principles applied to a dual-layer Blu-ray disc (BD).
Figure 1B:
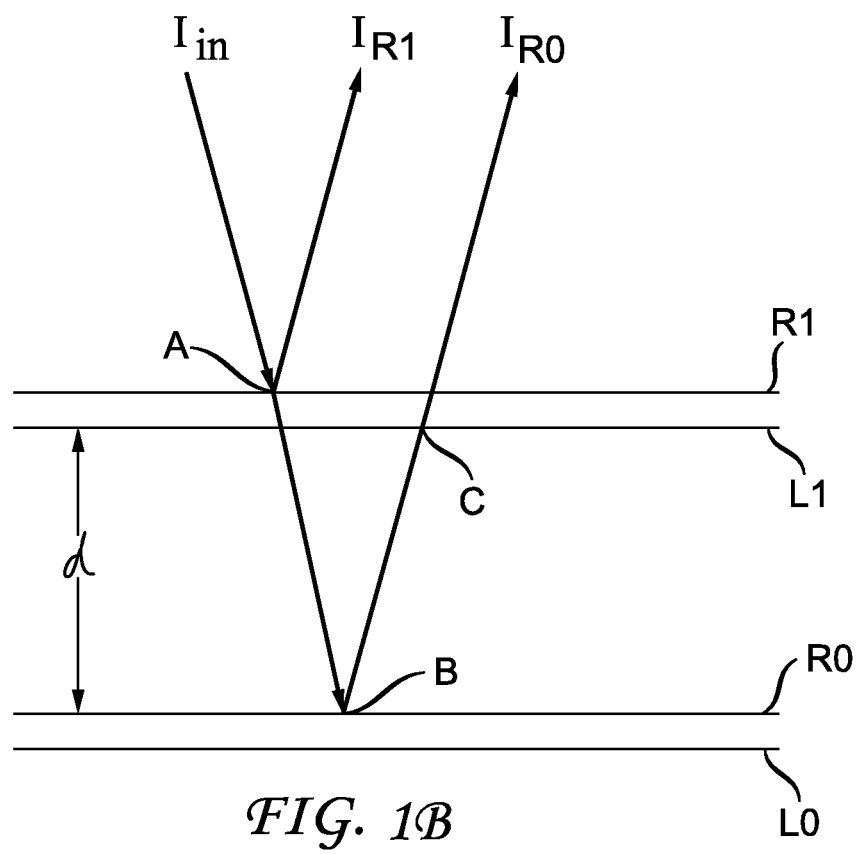
FIG. 1b illustrates light rays reflected from two data layers of a data disc.
Figure 2:
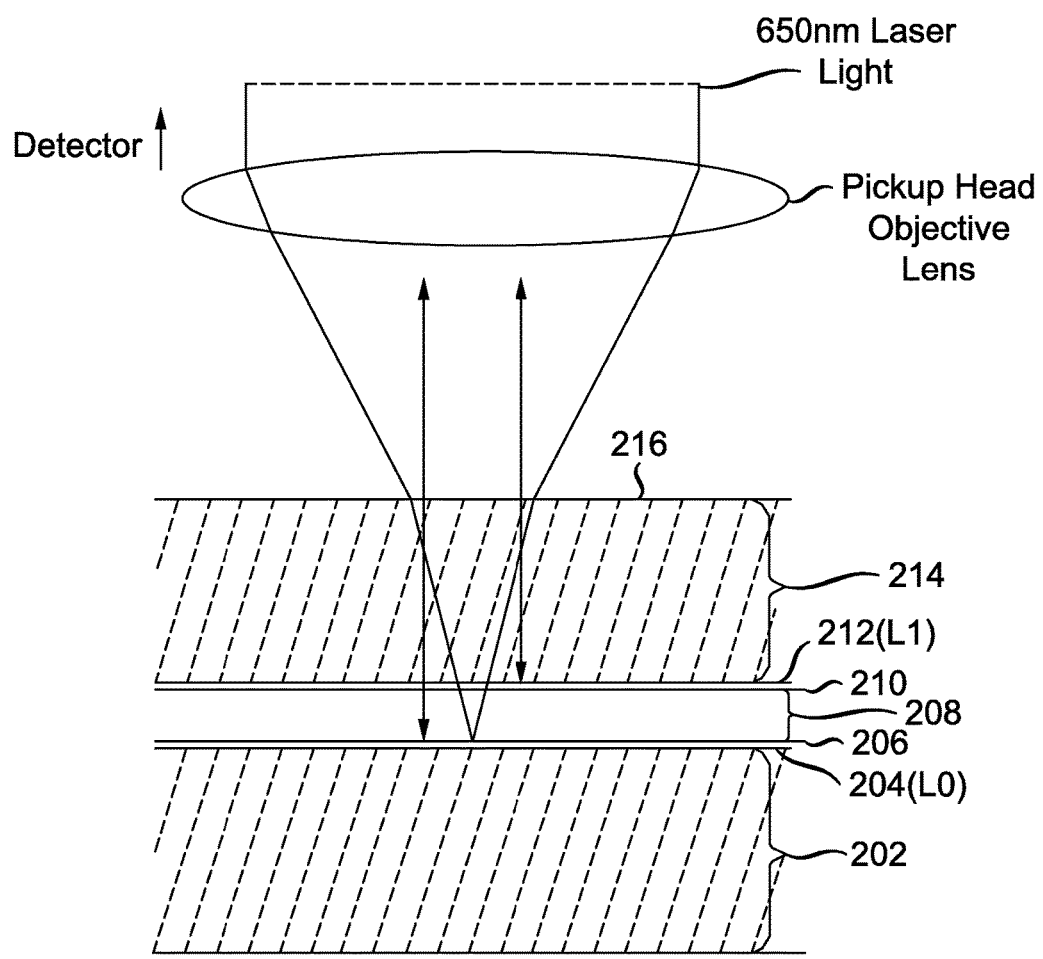
FIG. 2 illustrates another embodiment of the present principles applied to a dual-layer DVD.

FIGS. 1 and 2 illustrate the principles of interferometric fingerprinting applied to a dual-layer BD and DVD, respectively. FIG. 1a depicts a cross-sectional view of a dual-layer BD structure, which includes the following layers (listed in order from the bottom to the top of the BD structure): a disc substrate 102, a surface 104 of a data layer L0, a fully reflective layer 106, a spacer layer 108, a surface 110 of a data layer L1, a partially or semi-reflective layer 112, a cover layer 114, and a read-out surface 116. The read-out surface 116 typically comprises the surface of a hardcoat layer (about 3 μm of UV-curable material, (not shown in FIG. 1a) formed over the cover layer 114. The read-out surface corresponds to the disc surface through which laser light (typically at a wavelength of 405 nm for BD) enters to illuminate the data layers for reading data.

FIG. 2 depicts a cross-sectional view of a dual-layer DVD structure, which includes the following material layers (listed in order from the bottom to the top of the DVD structure): a disc substrate 202 (also referred to as Layer 1), a surface 204 of a data layer L1, a fully reflective layer 206, a spacer layer 208, a partially or semi-reflective layer 210, a surface 212 of data layer L0, the disc substrate 214, and a read-out surface 216 (which is an exposed surface of the disc substrate 214). Laser light, typically at a wavelength of 650 nm enters through the read-out surface 216 to illuminate the data layers in the disc to read data therefrom. The data layers L0 and L1 are typically formed on a corresponding disc substrate or cover layer of the BD or DVD structures by injection molding, stamping or embossing.

During the manufacturing process of a BD or DVD disc, ultraviolet (UV) curable resins are used in the creating the layers or in the bonding of a dual layer BD or a DVD disc. One or more of UV curable liquid resins are applied with a spin coating process to create a spacer layer (e.g., layer 108 in FIG. 1a and layer 208 in FIG. 2) between two data storage layers of a BD or a DVD such that the two data layers can be independently read by an optical disc drive by varying the focus depth of the optical pickup head during playback. The data storage layers, also referred to as the L0 and L1 layers, respectively, are formed on a BD or a DVD substrate by stamping, embossing, or molding. For a BD, a first data layer (L0) is formed on the substrate, while a second data layer (L1) is formed on the spacer layer. For a DVD, the UV curable resin layer (e.g., spacer layer 208 in FIG. 2) is also used to bond two independently molded substrates to form a dual-layer DVD. Curing of these layers of UV curable liquid resins occurs by irradiation with UV light.

The two optical disc layer's information-bearing surfaces (e.g., the surfaces 104 and 110 in FIG. 1a, respectively and the surfaces 204 and 212 in FIG. 2) are coated with fully-reflective layers and semi-reflective layers, respectively. The fully-reflective layers (e.g., the layer 106 in FIG. 1a, and the layer 206 in FIG. 2, respectively) and the semi-reflective layers (e.g., the layer 112 in FIG. 1a, and layer 210 in FIG. 2) typically comprise a material such as silver, aluminum, silicon or the like that reflects laser wavelengths used in optical disc playback devices. As shown in FIG. 1a and FIG. 2, laser light directed through a first disc surface (e.g., the read-out surfaces 116 and 216) for illuminating a data layer is reflected back, by the partially or fully reflective layer associated with that corresponding data layer towards a detector of a pickup head of a playback device (not shown).

The UV curable resin layers have a very small thickness (e.g., 25 micrometers (μm) for BD (e.g., layer 108 in FIG. 1a) and 40-70 μm for DVD (e.g., layer 208 in FIG. 2), as defined in the relevant optical disc standards and required for the accurate readout of the disc. Since this UV curable resin coating process is performed by spinning of a circumferential bead of liquid resin applied at the inner radius of a disc, the resulting thickness of the layer after spin coating and curing will have a high degree of variability unique to each disc.

When using coherent laser light (e.g., 405 nm for BD and 650 nm for DVD) to read the two data layers of a dual layer disc, optical interference will result from the light rays reflected back from the reflective layers associated with the two data layers. Depending on the path difference traversed by the two reflected light rays, either constructive or destructive interference will occur, resulting in corresponding light intensity modulations detected at the detector of an optical pickup device in DVD or Blu-ray player.

FIG. 1b depicts an expanded view of the laser light rays at a point on the disc, where $I_{in}$ represents an incident laser light ray, $I_{R1}$ and $I_{R0}$ represent the respective light rays reflected from reflective surfaces R1 and R0, respectively, (associated with corresponding data layers L1 and L0, respectively), and "d" represents the thickness of the spacer layer. For the sake of clarity, the incident and reflected light rays are shown as having angles different from the perpendicular to the various surfaces. In practice, these light rays strike the disc substantially perpendicular to its exposed surface (and thus, the rays are substantially perpendicular to the various disc layers). The path difference (i.e., along the path A-B-C) between reflected rays $I_{R1}$ and $I_{R0}$ is a function of the spacer layer thickness so the resulting interference pattern is also a function of the spacer layer thickness.

Coherent light interference between light reflected from the fully reflective and the semi-reflective data layers results in modulation of the amplitude of the read-out signal, which is detected by the optical disc drive pickup head detector. The interference will result in an intensity modulation with a periodicity given by λ/2n (where λ is the wavelength of the laser, and n is the refractive index of the spacer layer). The wavelength of the readout lasers for BD and DVD are typically 405 nm and 650 nm, respectively. The refractive index of the UV curable resin for the spacer layer is typically in the range of about 1.5 to 1.6, but may vary beyond these values. For the exemplary laser wavelengths and refractive index, the periodicity will be approximately 130.6 nanometers (nm) for BD and 209.7 nm for DVD. Thus, a difference in the spacer layer thickness of 130.6 nm in a BD, or 209.7 nm in a DVD, will typically give rise to one period of an interference cycle.

Figure 3A:
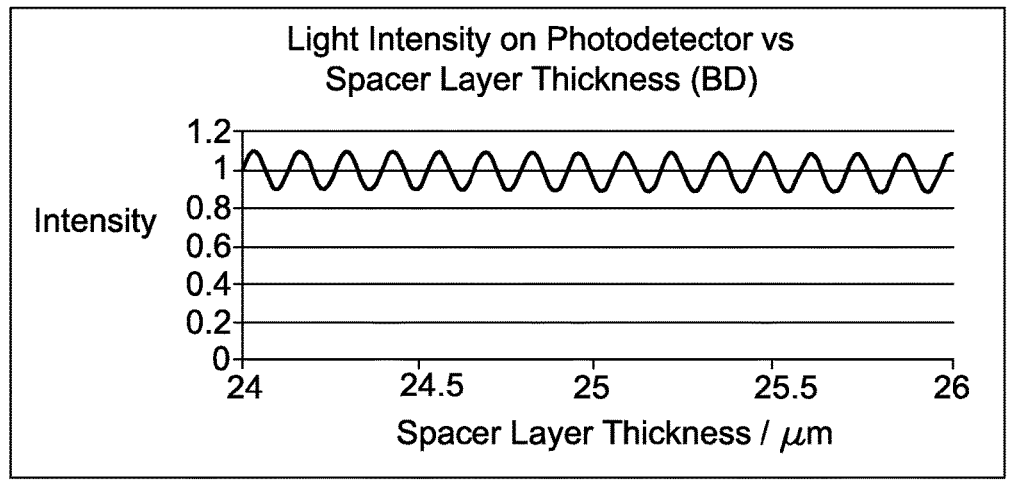
FIGS. 3a and 3b illustrate light intensity detected by a photodetector as a function of spacer layer thickness on a dual-layer BD and dual-layer DVD, respectively.
Figure 3B:
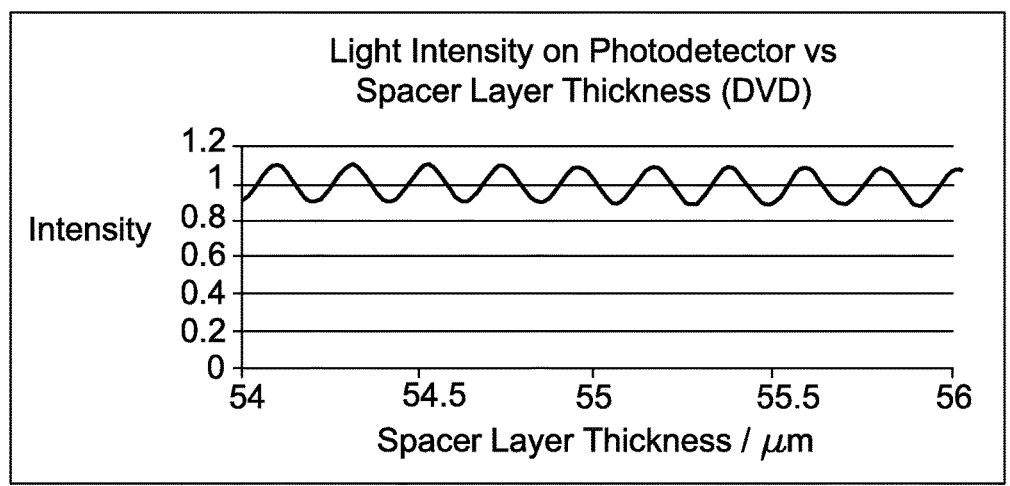

FIGS. 3a-b illustrate two examples of laser light intensity detected by a photodetector as a function of spacer layer thickness on a dual-layer BD and dual-layer DVD, respectively. The detected intensity is given by the equation:

$$I = I_o + I_{mod} \cos(4\pi dn/\lambda),$$

where I is the laser intensity detected at photodetector;
$I_o$ is the laser intensity without interference effects;
$I_{mod}$ is the intensity modulation amplitude (which depends on detector size, magnification of the optics, distance between layers, among other factors);
d is the thickness of the spacer layer for a dual-layer disc;
n is the refractive index of the spacer layer material; and
λ is the laser wavelength.

In the examples depicted in FIGS. 3a-b, $I_o$=1, and $I_{mod}$=0.1. The period of an intensity modulation cycle is given by λ/2n, which is 130.6 nm for BD (λ=405 nm, n=1.55); and 209.7 nm for DVD (λ=650 nm, n=1.55).

The above equation also applies to a single-layer disc, except that "d" will represent the thickness of a cover layer for a single-layer BD, or a substrate thickness for a single-layer DVD.

Figure 4:
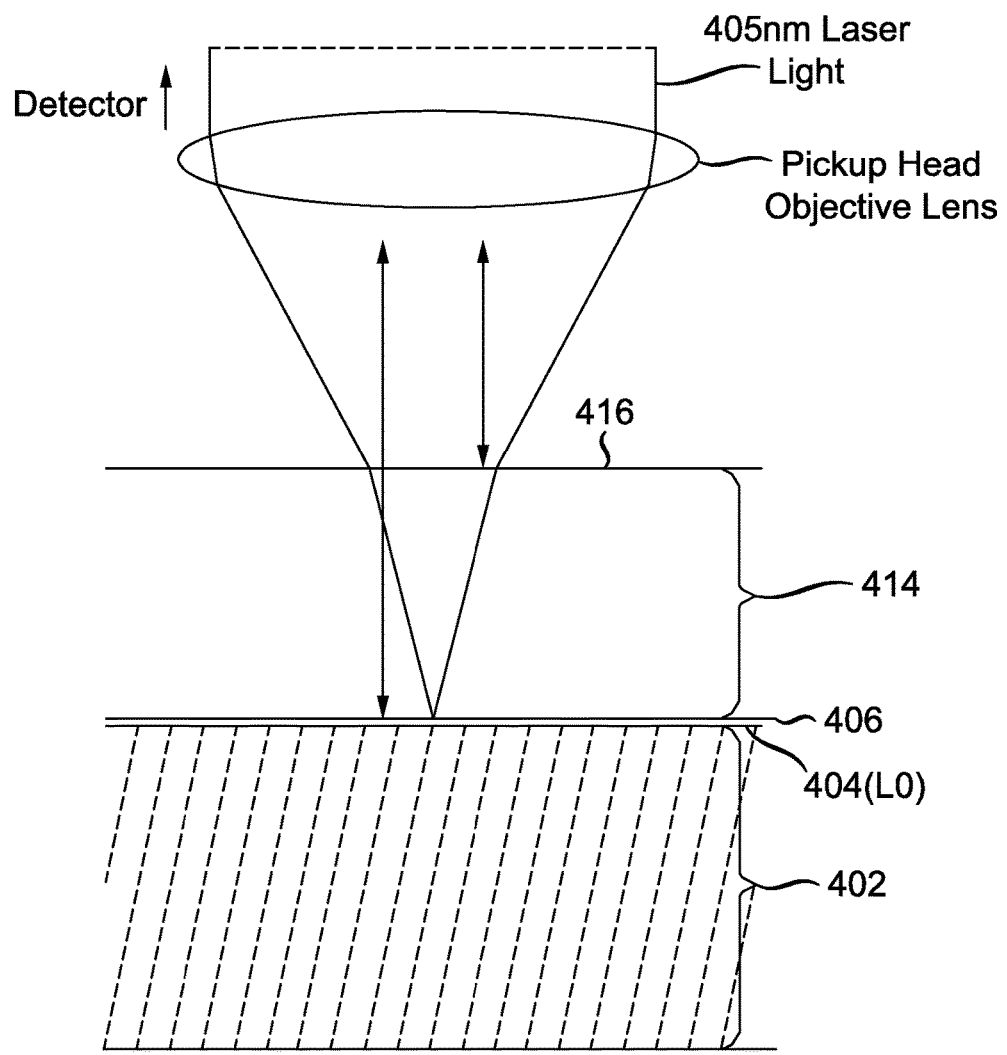
FIG. 4 illustrates interferometric fingerprinting applied to a single-layer BD.
Figure 5:
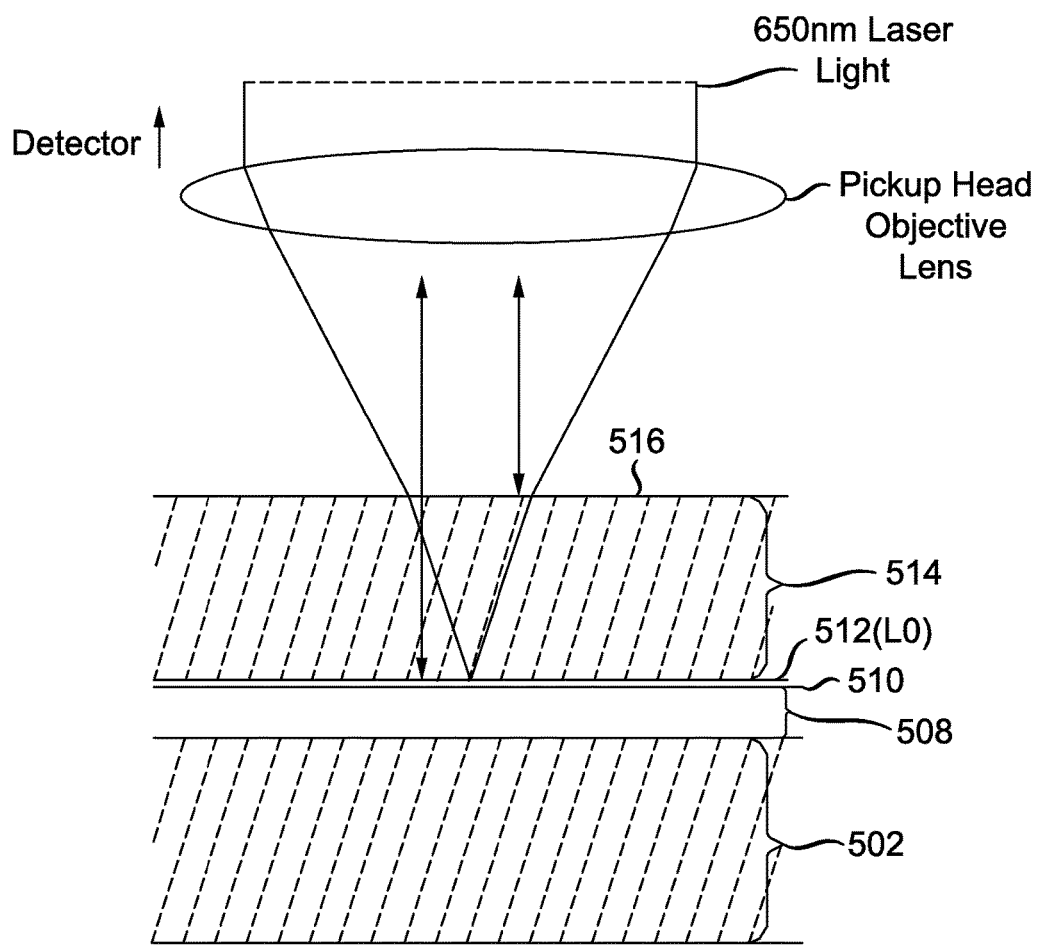
FIG. 5 illustrates interferometric fingerprinting applied to a single-layer DVD.

FIGS. 4 and 5 depict the principles of interferometric fingerprinting applied to single-layer BD and DVD, respectively. FIG. 4 depicts a cross-sectional view of a single-layer BD structure, which includes the following materials layers (listed in order from the bottom to the top of the BD structure): a disc substrate 402, a surface 404 of a data layer L0, a fully reflective layer 406, a cover layer 414 and a read-out surface 416. The read-out surface 416 typically comprises the surface of a hardcoat layer (about 3 μm of UV-curable material, not shown in FIG. 4) formed over the cover layer 414.

FIG. 5 shows a cross-sectional view of a single-layer DVD structure, which includes the following material layers (listed in order from the bottom to the top of the DVD structure): a disc substrate 502 (also referred to as Layer 1), a spacer layer 508, a fully reflective layer 510, surface 512 of a data layer L0, a disc substrate 514 (also referred to as Layer 0), and a read-out surface 516.

As depicted in FIG. 4 and FIG. 5, laser light directed through a first disc surface (e.g., read-out surface 416 and 516, respectively) onto a data layer is reflected back by the reflective layer associated with that data layer, towards the detector of the pickup head (not shown). Coherent light interference between light reflected from the fully reflective L0 data layer and the read-out surface results in a modulation in the amplitude of the read-out signal, which is detected by the optical disc drive pickup head detector. The interference will result in an intensity modulation with a periodicity given by λ/2n. In this case, n is the refractive index of the cover layer 414 for BD or disc substrate 514 for DVD, which is typically in the range of about 1.5 to 1.6, but may vary beyond these values. At the respective laser wavelengths and refractive index, the periodicity is approximately 130.6 nanometers (nm) for BD and 209.7 nm for DVD.

During read-out of an optical disc, laser light is focused onto a specific data layer, and light reflected from the disc is detected with a detector. The detected light intensity includes contributions from light reflected off the specific data layer (modulated by the lands and pits of the layer), as well as interference effects arising from light reflected off the read-out surface and the respective data layers.

For dual-layer discs, the primary interference contribution comes from light reflected off the two data layers L0 and L1, with weaker (or secondary) contributions from interference between light reflected off the read-out surface and each of the two data layers. As an example, reflected light from each data layer in a dual-layer DVD may be about 20% of the incident light intensity, compared to about 15% for each data layer in a dual-layer BD, and about 4% from the read-out surface. For single-layer discs, the interference effect arises from light reflected off the data layer L0 and the read-out surface.

Whether constructive or destructive interference is obtained from a pair of light rays reflected off a certain location on the disc will depend on the laser wavelength and the distance or separation between the corresponding reflective surfaces at that location. Due to thickness variations in the spacer layer and/or cover layer across a disc, these distances (i.e., distance between the two data layers, and distances between the read-out surface and each data layer) are not constant within a disc. Instead, these distances can vary at different locations along a radial direction (between inner and outer perimeter), or locations at a fixed radius of the disc, tangentially or circumferentially, or along any other arbitrary directions. Variations can be introduced into the manufacturing process that will increase the randomization or variation of the spacer layer thickness or substrate thicknesses. These process variations can include UV resin dispense volumes, spin off acceleration or velocity, infrared or ultraviolet irradiation doses, injection molding parameters or other means of increasing variation from disc to disc.

Since these variations are also unique from disc to disc, the particular variations of reflected light intensity due to interference effects are unique for every disc, and can be used as a fingerprint to uniquely identify a specific disc. If the interference fingerprint is measured during the manufacturing process, the representation of that fingerprint in mathematical form can be stored in either a BCA code or recorded onto a recordable zone on the disc or stored in an electronic memory, which is bound or attached to the disc. Alternatively, the memory device can be physically separate from the disc (i.e., an external device), but operatively coupled to an optical disc drive or player or a computer to allow access to fingerprint-related information stored in the memory. Many different types of devices are suitable for this purpose, including for example, RFID, USB memory sticks, among others.

The fingerprint information may be secured with a cryptographic signature using a secret key. Various mathematical algorithms can be used to describe, compress and encrypt the fingerprint information of each disc during the disc manufacturing process. Inverse mathematical processes can be used during the disc playback process to distinguish the interference fingerprint and authenticate the disc. The fingerprint information, also referred to as authentication data, can be derived from a complete interference pattern, or one or more portions of the interference pattern. Such data can also be provided in different formats, whether encrypted or not, including for example, bitmap, matrix, or a compressed image of the interference pattern, among others.

The BCA code written into the BCA zone or other zones of the optical disc may comply with the one or more of the BD, DVD or other optical disc standards or may deviate from the optical disc standards with a custom or application specific format. The BD and DVD standards (e.g., White Paper Blu-ray Disc Format—1.C Physical Format Specifications for BD-ROM, $6^{th}$ Edition of December 2010 or $8^{th}$ edition from December 2012; and Standard ECMA-267, 120 mm DVD—Read-Only Disk, $3^{rd}$ edition, April 2001) allow for only a fixed amount of data to be written with only one band of information throughout the BCA writable zone. More data than specified in these standards may be required to adequately describe the Optical Disc Interference Fingerprint on the present principles. A non-standard BCA format could allow for an increased amount of data to be written into these zones. This could be accomplished by increasing the data density in the tangential direction by writing smaller features or by breaking the BCA zone into multiple bands in the radial direction thereby multiplying the amount of data written into these zones. The BCA data may be written into the positions described in the optical disc standards or may be written into other positions on the optical discs, or alternatively, may be written into both. The interferometric fingerprint can be determined and characterized at the final stages of the manufacturing process. This characterization is accomplished using the pickup head of an optical disc drive. Various methods can be used for the fingerprint characterization such as readout at one or more selected radii, on one or more sector locations on one or more layers of the disc, by spiral scanning of the optical disc drive pickup head across the readout surface of the disc or by concentric ring scanning of the optical disc drive pickup head across the readout surface of the disc as it is being rotated by the spindle motor. The fixed radii, fixed sector number, spiral scanning and concentric scanning processes may take place with the optical disc drive laser being focused on or between any of the information (or data) layers. In general, the spiral and concentric scanning processes can be performed at any arbitrary spacing or pitch, although in some cases, certain conditions may be preferred based on operation efficiency considerations. In one example, the spacing or pitch can range from about 0.01 millimeter (mm) to about 10.0 mm.

The characterization processes may take place while locked on an information track or open loop, without being locked to an information track. In addition, an angular reference point may be used for angular registration of the Interferometric Fingerprint. For single layer applications, it may be possible to use the reflective coated information layer and the data readout surface of the optical disc to obtain an interferometric fingerprint, as discussed above in connection with FIGS. 4-5 for a single layer BD and a single layer DVD, respectively.

The present principles of interferometric fingerprinting can also be applied to other optical disc formats, including, for example, disc formats having three or more layers, single-sided or double-sided discs, as well as read-only, write-once or re-writable recordable disc formats.

FIG. 6a illustrates a readout signal obtained in one revolution of an optical disc (at a fixed radius "r" of the disc), with a high frequency portion corresponding to signals arising from data in a data layer, and the low frequency portion arising from amplitude modulation due to interference effects. The axis of FIG. 6a is delineated in volts and reflects the magnitude of the output signal of the pick-up head of the optical detector. The full readout signal is bounded by a lower envelope 620 and an upper envelope 610. An example of a cycle or period of the intensity modulation (arising from the spacer thickness variation at the readout signal locations of the disc) is shown in FIG. 6a as a peak-to-peak separation in the low frequency portion of the signal. In practice, the signal processing method makes use of low pass filtering or upper/lower envelope filtering or a combination of all. If one does a low pass filtering of the HF signal without any envelope filters the resulting signal will be substantially equivalent to a combination of upper and lower envelope.

FIG. 6b shows one example of an interferometric fingerprint signal, which can be obtained by applying a low pass filter to the upper envelope portion 610 of the signal of FIG. 6a. The low pass filtering occurs during step 1010 in FIG. 10a described hereinafter. In the illustrated embodiment, the filtering is applied to the resampled data. The signal depicted in FIG. 6b will always have the same appearance with or without resampling. The resampling is only required if one wants to obtain a fixed number of values regardless of the number of values in the envelope signal where the number of values per rotation might depend on the measurement radius. Due to its improved signal to noise ratio, the filtered signal may be a better fingerprint for authentication purpose, compared to the unfiltered signal. While it is not shown in FIG. 6a, a similar interference pattern can be obtained from the lower envelope 620, although the amplitude may be lower compared to that from the upper envelope.

Figure 7A:
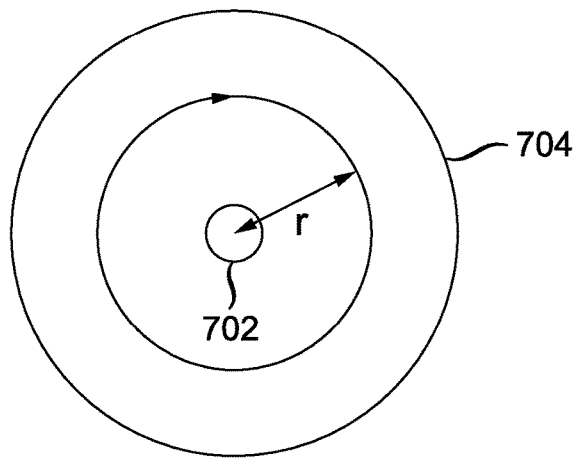
FIG. 7a illustrates an example of obtaining the interferometric signal of FIG. 6a by monitoring reflected light intensities at locations along a circular path on the disc.
Figure 7B:
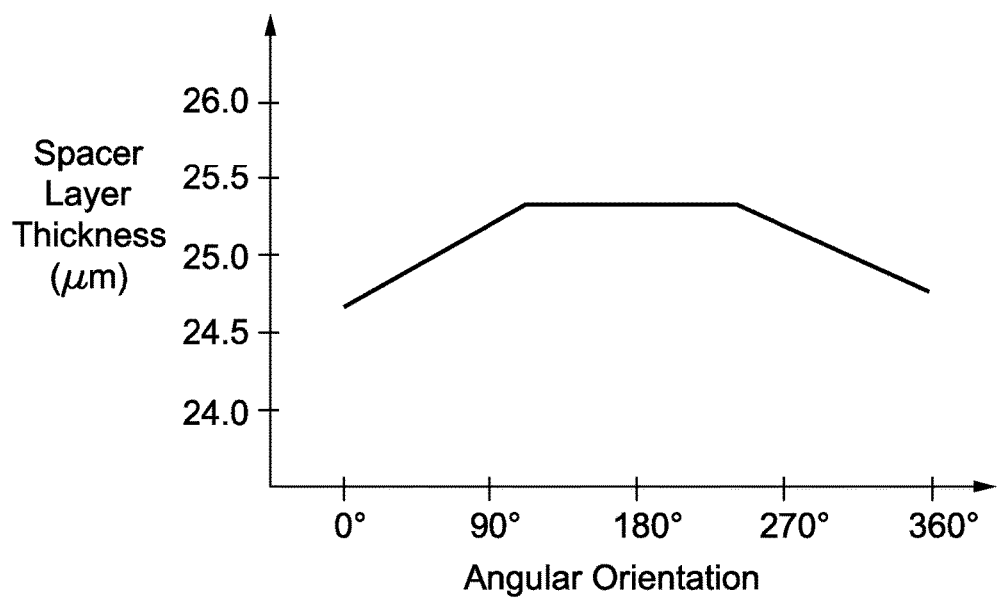
FIG. 7b illustrates an example of spacer layer thickness as a function of angular orientation of the disc.

FIG. 7a illustrates an example of obtaining the interferometric signal of FIG. 6a from an optical disc (with inner perimeter 702 and outer perimeter 704) by monitoring reflected light intensities at locations on the optical disc read-out surface along a circle (circular path or locus) with radius "r", and FIG. 7b is an example of the spacer layer thickness as a function of angular orientation of the disc (at locations along the circular path with a fixed radius r). The thickness variations along the circular path in FIG. 7a can give rise to interferometric signals at corresponding locations, similar to those shown in FIGS. 6a-b.

Figure 8:
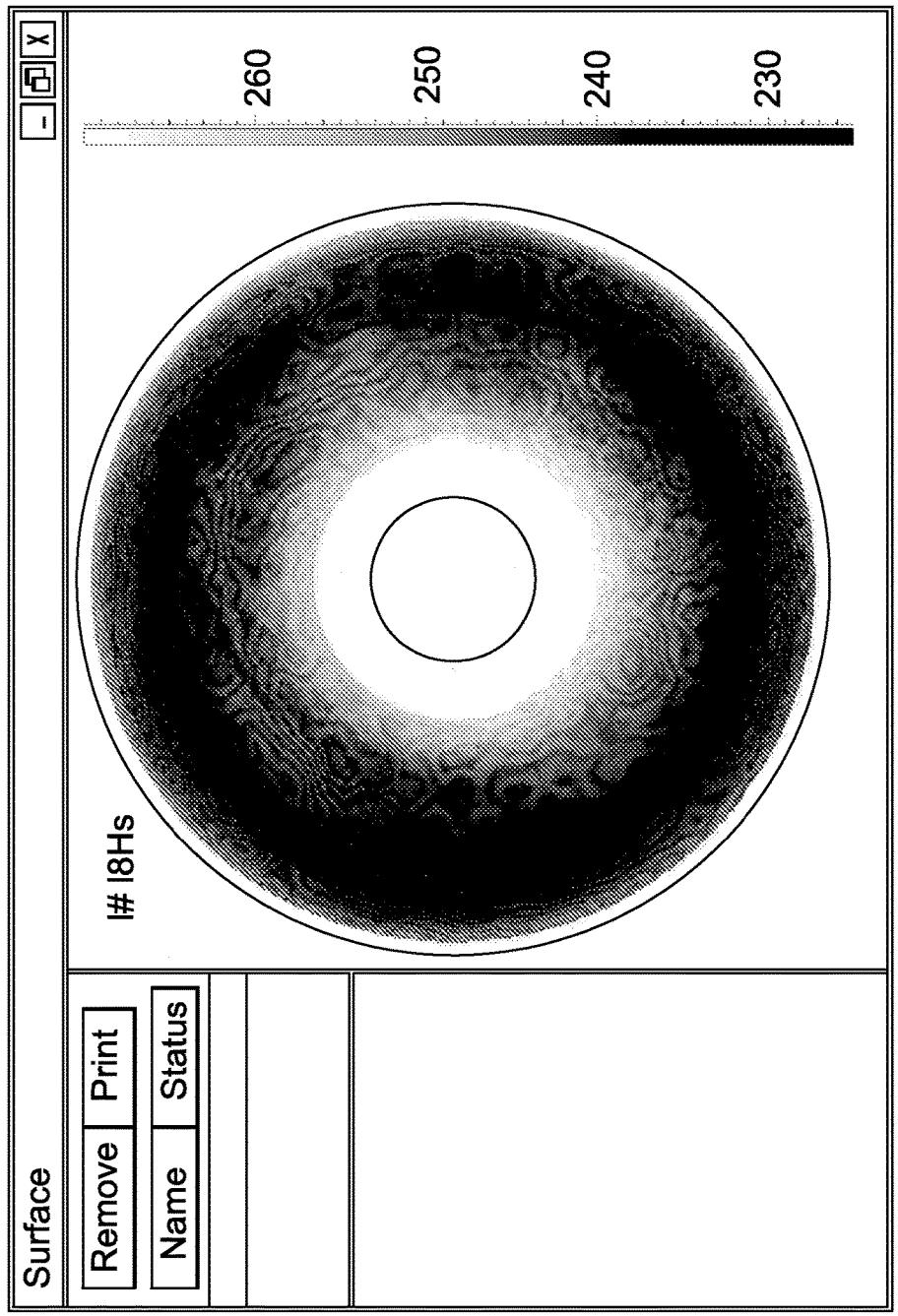
FIG. 8 illustrates another example of a representation of an interferometric fingerprint pattern for the entire surface of an optical disc.

FIG. 8 shows an example of a surface representation of the interference pattern as seen in the upper envelope. This example is an "I8Hs" graph, which represents an interferometric fingerprint pattern or interferogram for an optical disc. This graph can be obtained using a Nok9 BD-CATS B210 test system (available from Nok9 AB, located in Malmö, Sweden), which is often used for quality control of replicated discs. The system measures electrical signals from an optical drive playing the disc that is being characterized, i.e., the disc whose fingerprint data is being measured or determined. The I8Hs graph is specific to the above test system, and ( ) the CATS system only provides the upper envelope graph I8Hs and in addition I8Mods which contains both upper and lower envelope information. Other suitable systems can also be used to generate similar representations of the fingerprint pattern. In FIG. 8, the illustrated pattern spanning the surface of the disc reflects the thickness variations of the spacer layer between two data layers. One or more portions of this interferogram can be selected for disc authentication purpose. For example, a plurality of selected portions of the interferogram, e.g., corresponding to concentric rings and/or sectors on the disc, can be combined or reduced into one or more unique identifiers, which can then be encrypted and stored in memory for disc authentication purpose. The memory for storing the unique identifier or fingerprint-related information can be integral or attached to the disc (e.g., written to one or more recordable regions of the disc, BCA area, or to an RFID formed on the disc), or to an external memory device that is operatively coupled to suitable optical disc drive for storing or retrieving information.

Before the disc's content is accessed in a consumer playback device, the disc player, when equipped with the appropriate detection electronics, can also measure the reflectivity variation from the read-out signal and compare it to the fingerprint information data stored during the manufacturing process. If the measured reflectivity variation matches the fingerprint information, the disc is authentic and the disc playback device can access the disc's contents. If measured reflectivity information and stored fingerprint do not match, the disc constitutes a non-authentic copy, and the playback device will not access disc's contents. Note that any attempt to copy the fingerprint-related or authentication data from a genuine disc onto any other disc will not be successful, because if authentication data from one disc is re-recorded to a different disc, the copied authentication data will not match any of the interference patterns (or fingerprint-related data) measured on that other disc. The fingerprint information could also be used as a cryptographic key to decrypt information stored in the BCA, recordable zone or memory device, which is required for the decryption of the disc's content.

The optical disc playback device may need modifications and or additional hardware and/or software to detect and measure the readout signal amplitude variations. The modifications can include modifications in the detector signal processing electronics, such as analog to digital converter. Additional hardware could include low pass filter circuitry to detect the signal modulation processing circuitry to detect and condition the signal. The additional software would implement low pass filtering and amplitude measurement algorithms. In addition, additional software would implement algorithms required to analyze and characterize the detected signal and convert the signal into digital information that represents the interferometric fingerprint. Such additional software would also authenticate the disc by comparing the interferometric fingerprint read from the disc to that written and stored on the disc or other ancillary memory as discussed previously.

The electronics and software described above can also be used in an optical disc drive used in the manufacturing process to read and process the interferometric fingerprint prior to writing the information to the disc or to an ancillary device.

Thus, as part of a disc manufacturing process, an optical disc drive will read the disc fingerprint and record or write the authentication data (related to the fingerprint pattern) to a BCA, recordable zone or data storage device, which can be in encrypted form. Alternatively, the authentication data can also be stored at a location remote to the disc, including, for example, the cloud, for online authentication.

Before the disc can be used by an end user, an optical disc player will decrypt (if needed) the authentication data from the disc, measure the interference fingerprint on the disc, and compare with the previously stored authentication data to see if the disc is authentic. Information relating to the location of the stored authentication data and/or the location for measuring the interference fingerprint can be provided to the disc player using different methods, including for example, being provided in the BCA area or recordable zones, data storage device, or other pre-recorded regions of the disc, among others.

Figure 9A:
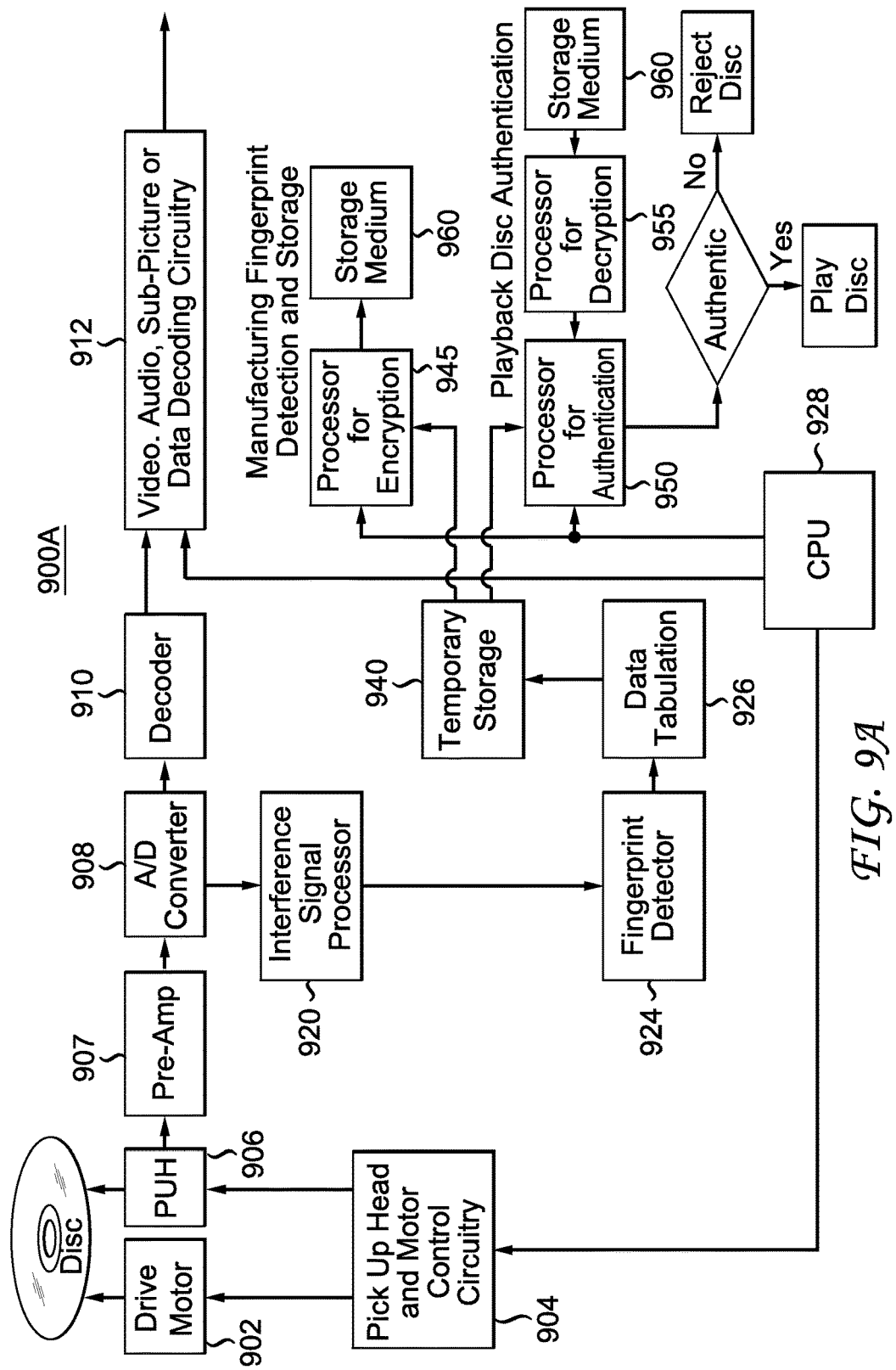
FIG. 9a illustrates one example of an apparatus for implementing a method according to the present principles.

FIG. 9a illustrates an exemplary optical disc playback device 900A suitable for implementing the method according to the present principles to generate and process optical interference signals for disc authentication. The optical disc playback device 900A includes the components found in a standard DVD or BD disc player (i.e., components required for play-out of disc content), as well as components for practicing the present principles. In some instances, some of the optical disc playback device 900A components serve a dual purpose as described hereinafter. As depicted in FIG. 9a, the optical disc playback device 900A includes a drive motor 902 for rotating an optical disc such as a DVD or BD under the control of a servo-mechanism 904 having associated control circuitry. The servo-mechanism 904 also controls a pick-up head motor (not shown) that moves an optical pick-up head (PUH) 906 having a read-out laser (not shown) across the rotating spinning optical disc to read information from the disc. As known to one skilled in the art, the PUH includes a photodetector (not shown in FIG. 9a) for detecting light reflected from the optical disc. A pre-amplifier 907 amplifies the output signal of the pick-up head 906 for input to an analog to digital (A/D) converter 908. The digital signal output from the A/D converter 908 is decoded by low-level decoder 910 to yield channel code and error correction data for input to a high level decoder 912 to yield video, audio, sub-picture data for output to a display device or a computer or the like.

Within the DVD or BD player, a central processing unit (CPU) 928, typically in the form of a microprocessor with associated memory, or a microcomputer or microcontroller, is used to control operation of the disc player, including controlling the servo-mechanism 904 to move the pick-up head 906 to retrieve a desired program content, and decoding the program content for playout. In practice, the CPU 928 also has links to other elements of the optical disc playback device 900A (not shown) for exchanging data therewith and for controlling the operation thereof. The CPU 928 also tells other elements when data is valid or the elements are receiving sector numbers.

According to the present principles, the optical disc playback device 900A also various elements described hereinafter for processing the signals obtained by the read-out laser of the pick-up head 906 to derive authentication data from optical interference caused by the laser light reflecting from different layers/surfaces of the disc. As shown in FIG. 9a, the digital signal output from the A/D converter 908 is processed by an interference signal processor 920 to process and to filter the upper envelope of the digitized pick-up signal. The signal from processor 920 passes to a processor 924 for detecting a fingerprint pattern associated with a location or sector of the optical disc. The fingerprint data undergoes processing by a processor 926 into a suitable format for storage in a temporary storage unit 940.

Depending on the specific situations or application needs, the fingerprint data can be stored for use as authentication data for the disc, or be used for authenticating the disc. For example, when using the optical disc playback device 900A during a manufacturing process of the disc, i.e., the playback device can establish fingerprint data for storage in temporary storage 940. A processor 945 can encrypt the data which then undergoes storage in a storage medium 960. The storage medium 960 can take the form of the optical disc itself, by making use of a location on the disc (e.g., the BCA or other recordable zone) to record the fingerprint data (i.e., the interferometric authentication information). In addition to, or in place of—, or using the disc itself as the storage mechanism, other storage mechanisms external to the disc and even the disc playback device could serve this function as well.

When using the optical disc playback device 900A to perform disc authentication, a processor 950 will access the fingerprint data in the storage unit 940 for comparison against predetermined fingerprint data for the disc to determine whether to grant access to the content. In the illustrated embodiment, a processor 955 retrieves predetermined fingerprint data (i.e., determined during disc manufacturing) for the disc from storage medium 960. (Note that this function performed by the processor 955 could also be performed by the processor 945, thus obviating the need for the processor 955.) By comparing the fingerprint data measured from the disc (e.g., the fingerprint data stored in the temporary storage 940) with the predetermined fingerprint data retrieved from storage unit 960, the processor 950 can establish the authenticity of the disc. If the fingerprint data obtained from the disc pending authentication matches the predetermined data, then the disc is authentic, and playback of the disc can proceed. If the measured fingerprint data does not match the predetermined data, then the disc is not authentic, and the optical disc player will reject the disc.

Figure 9B:
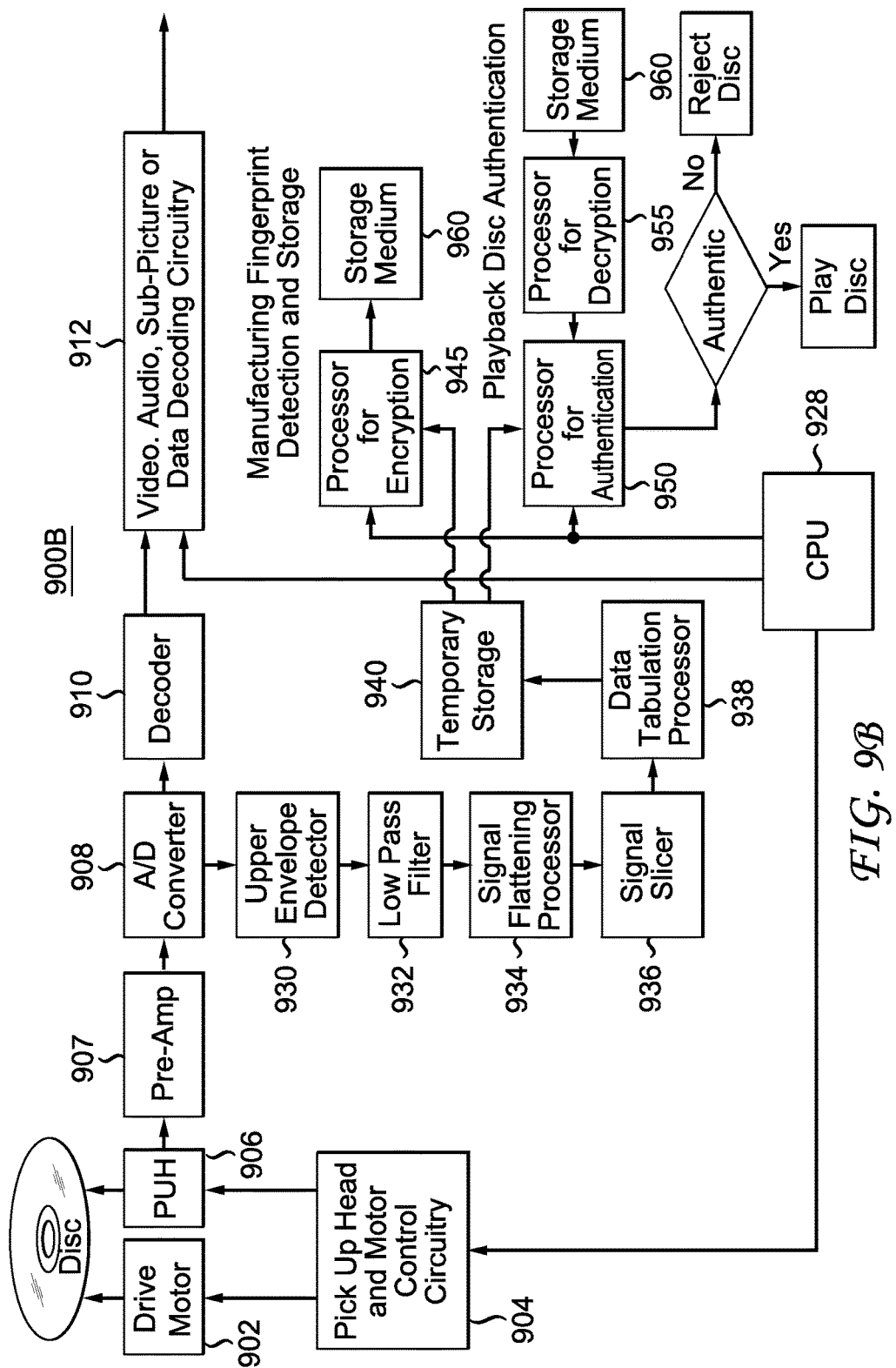
FIG. 9b illustrates another example of an apparatus for implementing a method according to the present principles.

FIG. 9 illustrates another exemplary optical disc playback device 900B with elements 930, 932, 934, 936, and 938 cooperating to generate and process interferometric authentication according to the present principles. The optical disc playback device 900B of FIG. 9b shares many elements in common with the optical disc playback device 900A and like reference numbers serve to identify like elements. The optical playback device 900B of FIG. 9b differs from the optical playback device 900A of FIG. 9 by making use of an upper envelope filter 930 to filter the digital signal output from the A/D converter 908. Furthermore, a low pass filter is used to filter out the high frequency signal and re-sample to 1000 sample points The upper envelope filter and low pass filter perform different functions. The upper envelope filter provides a signal, which corresponds to the upper envelope. This signal then undergoes low-pass filtering before being resampled. In practice, the output from the A/D converter 908 undergoes processing by the upper envelope filter 930 to provide a signal corresponding to the upper envelope. Furthermore, the signal is resampled to a fixed number of sample points per rotation, e.g. 1000 and then low pass filtered to remove remaining, unwanted high frequency signal components.

A second order low pass filter 932 is applied to the re-sampled signal, with a cutoff equivalent to about 5 degree of a rotation. In this case, the filter cutoff is specified as a fraction of disc rotation (instead of being specified as a frequency, as is commonly done), so that it is independent of the actual frequency that the disc is spinning during measurement of the fingerprint data. For example, if the disc rotates at 10 Hz, then the 5 degree cutoff will correspond to a cutoff frequency of 360 deg/5 deg*10 Hz=720 Hz.

A processor 934 processes the low-pass filtered signal by subtracting off very low frequency components, typically a cut-off value corresponding to a quarter disc rotation (90 degrees). This flattening corresponds to high pass filtering the signal. A processor 936 then slices the signal at 0 level to obtain a digital representation of the fingerprint corresponding to a start or initial sector number. In other words, the processor 936 processes the signal as a sequence of a logical "0" or "1". A processor 938 arranges the signal in a suitable format, for example, by tabulating the signal. The formatted signal then undergoes stored in a storage medium or device, e.g., a temporary storage 940.

If the optical disc playback device 900B of FIG. 9b serves to determine fingerprint data during manufacturing of the disc, one or more elements can process signals for determining the interferometric authentication data, such as elements 930, 932, 934, 936 and 938. This data typically undergoes encryption by the processor 945 before being stored in storage medium 960. As discussed, the storage medium 960 can comprise a portion of the disc itself, or an external storage device separate from the disc.

If the system 900B is used for authenticating a disc prior to granting access to a user for disc playback, the previously stored authentication data (e.g., at a location on the disc or storage external to the disc) is retrieved from storage 960 and decrypted by one or more processors 955. The processor 950 (which can be the same as, or different from processor 955) will then compare the retrieved authentication data with the authentication data or interferometric information determined from the disc being authenticated for purpose of authenticating the disc.

As described, the optical playback devices 900A and 900B of FIGS. 9a and 9b, respectively, include separate processors for performing individual tasks. The functionality of some or even all of such individual processors could exist in a single processor, not shown.

Figure 10A:
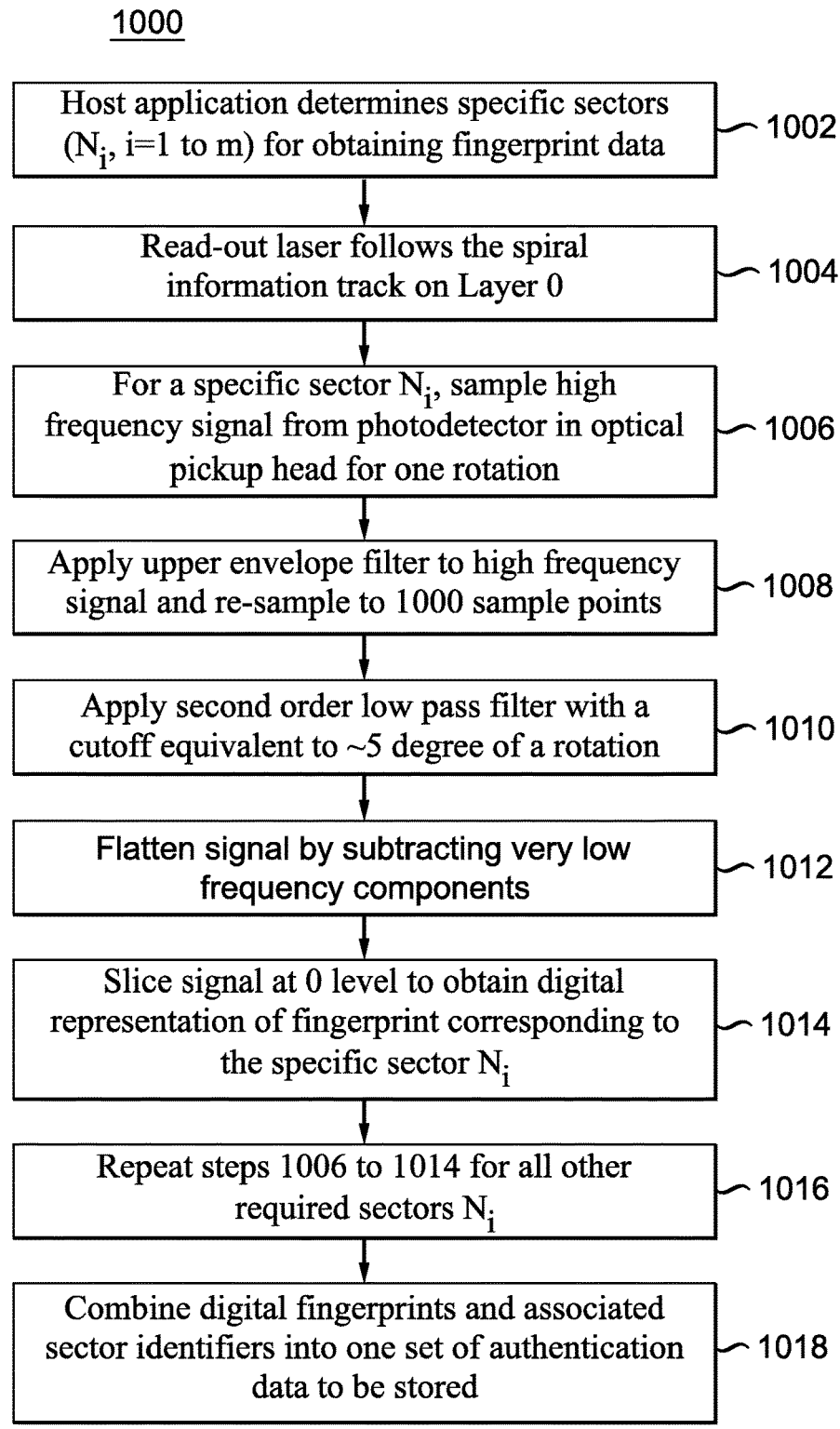
FIG. 10a illustrates a method of generating authentication data for a disc based on interferometry according to one embodiment of the present principles.

FIG. 10a illustrates in flow chart form the steps of a method 1000 of establishing interferometric authentication data for an optical disc according to one embodiment of the present principles. At step 1002, a processor for implementing method 1000 (e.g., a host application or software algorithm) determines which sectors of the disc for which authentication data based on optical interference are to be determined. For example, a number of sectors "m" at specific locations can be identified by individual sector identifiers $N_i$, with an index i (integer) going from 1 through m, where m is a positive integer.

At step 1004, the read-out laser follows the spiral information track on Layer 0 of the disc. At step 1006, at a specific sector identified by sector $N_i$ (e.g., i=1 for a first sector), high frequency signal is sampled from a photodetector in the optical pick-up head for one rotation of the disc. At step 1008, the high frequency signal undergoes upper envelope filtering and the filtered signal, i.e., the remaining low frequency signal, undergoes re-sampling to 1000 sample points. The upper envelope filter used in this context will find the largest HF signal value for every time interval when one rotation of the disc is sub-dived into a number k(r) of constant size time intervals. In practice, this number of time intervals k is >1000 and this number may depend on the measurement radius. The resampler (often referred to as the sample rate converter) used in this context reduces the number of sample values per rotation k, where k could be a function of the measurement radius, to a fixed number l with 1<k. Numerous methods for the desired sample rate conversion are known. The simplest method takes the sample values from the original sample timestamp being closest to the target time stamps. For example, when k=10000, and l=1000, the resampling will take the $1^{st}$, $10^{th}$, $20^{th}$, $30^{th}$ etc. original values as resampled result values.

Figure 10B:
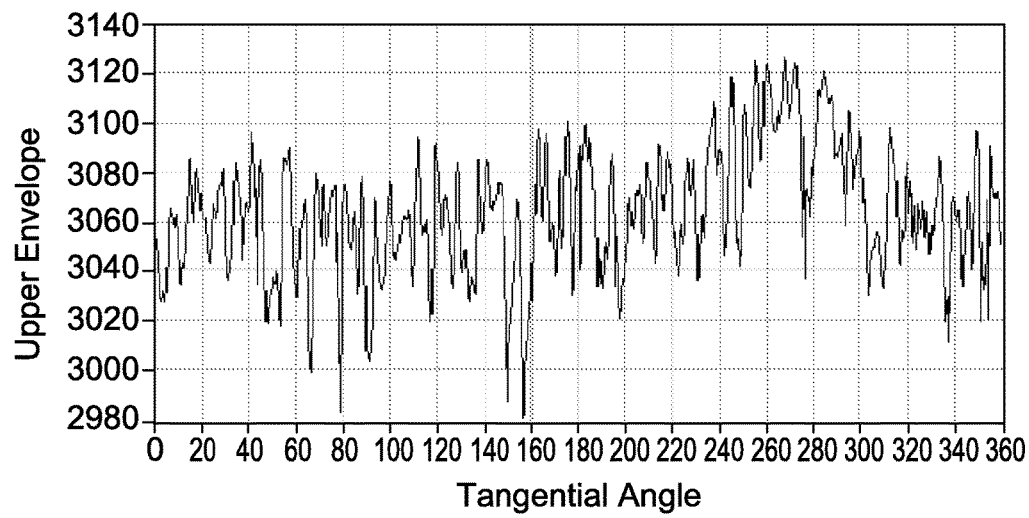
FIGS. 10b-g illustrate examples of signals at certain stages of method of FIG. 10.

The re-sampling of 1000 points can be performed in one rotation, or in "N" number of rotations, where N is an integer greater than 1. For re-sampling in at least two rotations (N≥2), the data at each sampling point (corresponding to a different location on the disc) will be averaged over the data obtained for that same sampling point from all N rotations. Taking N rotations (e.g., N in the range of 2 to approximately 1000) will reduce the noise in the signal. It is understood that re-sampling can be performed for other number of points, and 1000 is only used in this specific example. FIG. 10b shows an example of the signal after the high frequency component has been filtered out, with the ordinate values having an arbitrary unit of measure proportional to the voltage generated by the optical pick-up head.

Figure 10C:
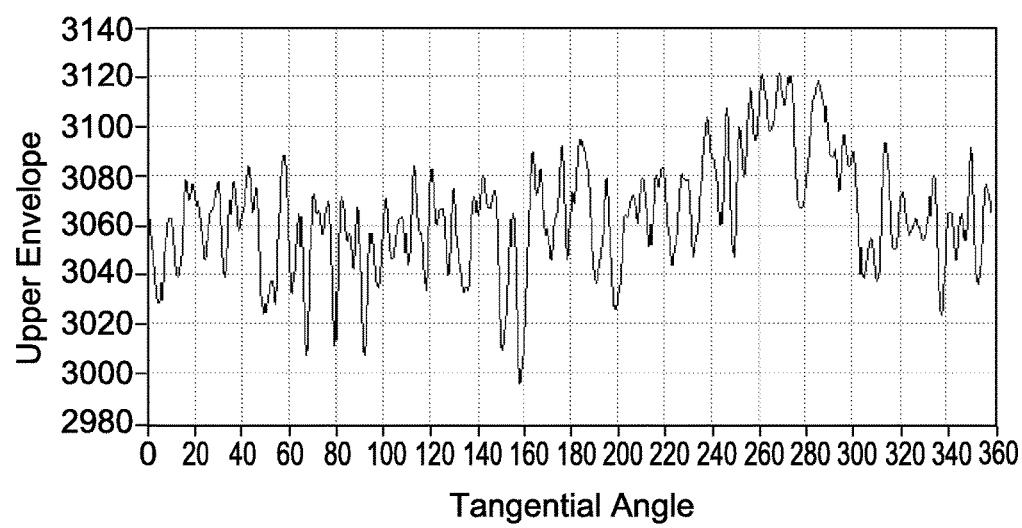

Returning to FIG. 10a, during step 1010, the re-sampled signal undergoes a second order low pass filtering, with a cutoff equivalent to ~5 degree of a rotation. As is known to those skilled in the art, a second order filter reduces higher frequencies more steeply than a first-order filter, e.g., a second order filter will typically provide 12 dB attenuation per octave as compared to 6 dB per octave for a first order filter. The use of a second order filter is only exemplary, and any order filter can be used (e.g., higher than second order, or even first order). The filtering in this step serves to improve the signal to noise ratio. FIG. 10c shows an example of the signal after the low pass filtering.

Figure 10D:
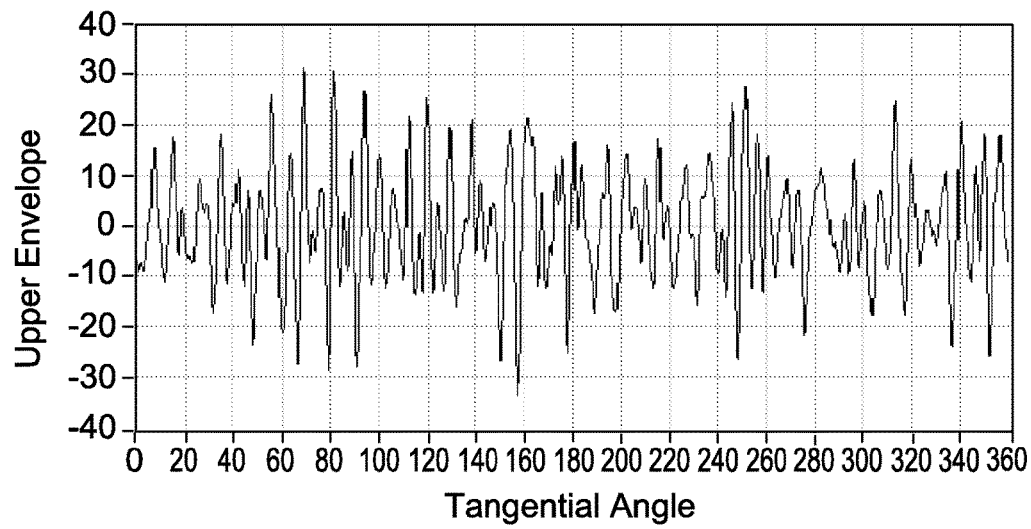
Figure 10E:
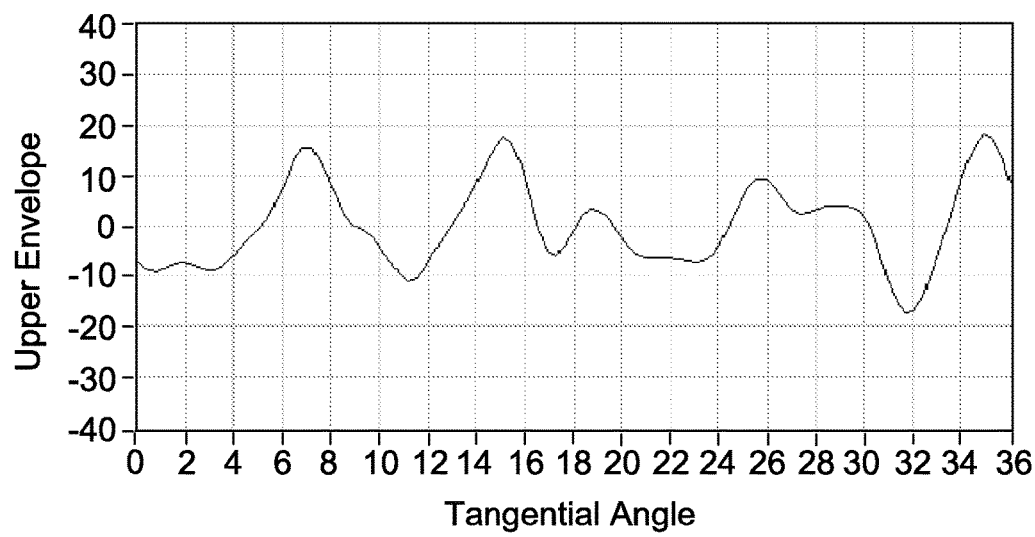

Referring back to FIG. 10a, during step 1012, the signal flattening occurs by subtracting very low frequency components. FIG. 10d shows an example of the signal after subtraction of the low frequency components. FIG. 10e shows an expanded portion of the signal for tangential angles in the range of 0 to 36 degrees. The tangential angle refers to the angle of rotation of the disc, along the track direction.

Figure 10F:
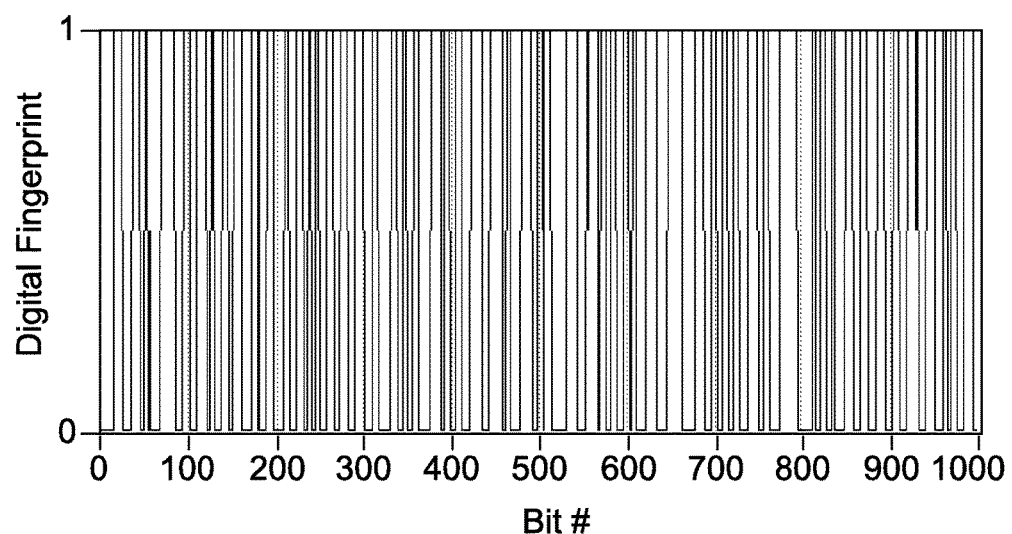
Figure 10G:
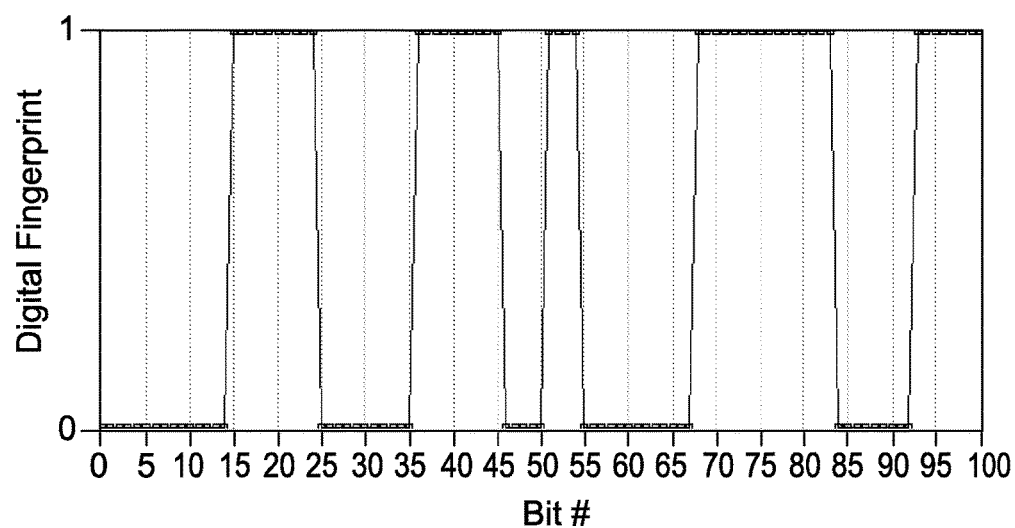

During step 1014 of FIG. 10a, the signal undergoes slicing at the 0 level to obtain a digital representation of fingerprint or interferogram corresponding to the initial sector number. FIG. 10f shows an example of the signal after being sliced at 0 level, and FIG. 10g shows an expanded portion corresponding to bit numbers with a counting index from 0 to 100. During step 1016 of FIG. 10a, the signal processing steps 1006 to 1014 repeat for all other sectors $N_i$ for which authentication data are required.

During step 1018, the digital fingerprints and corresponding sector numbers are combined into a set of authentication data stored on the disc or other suitable storage medium external to the disc. At step 1020, the set of authentication data undergoes encryption and storage.

Figure 11:
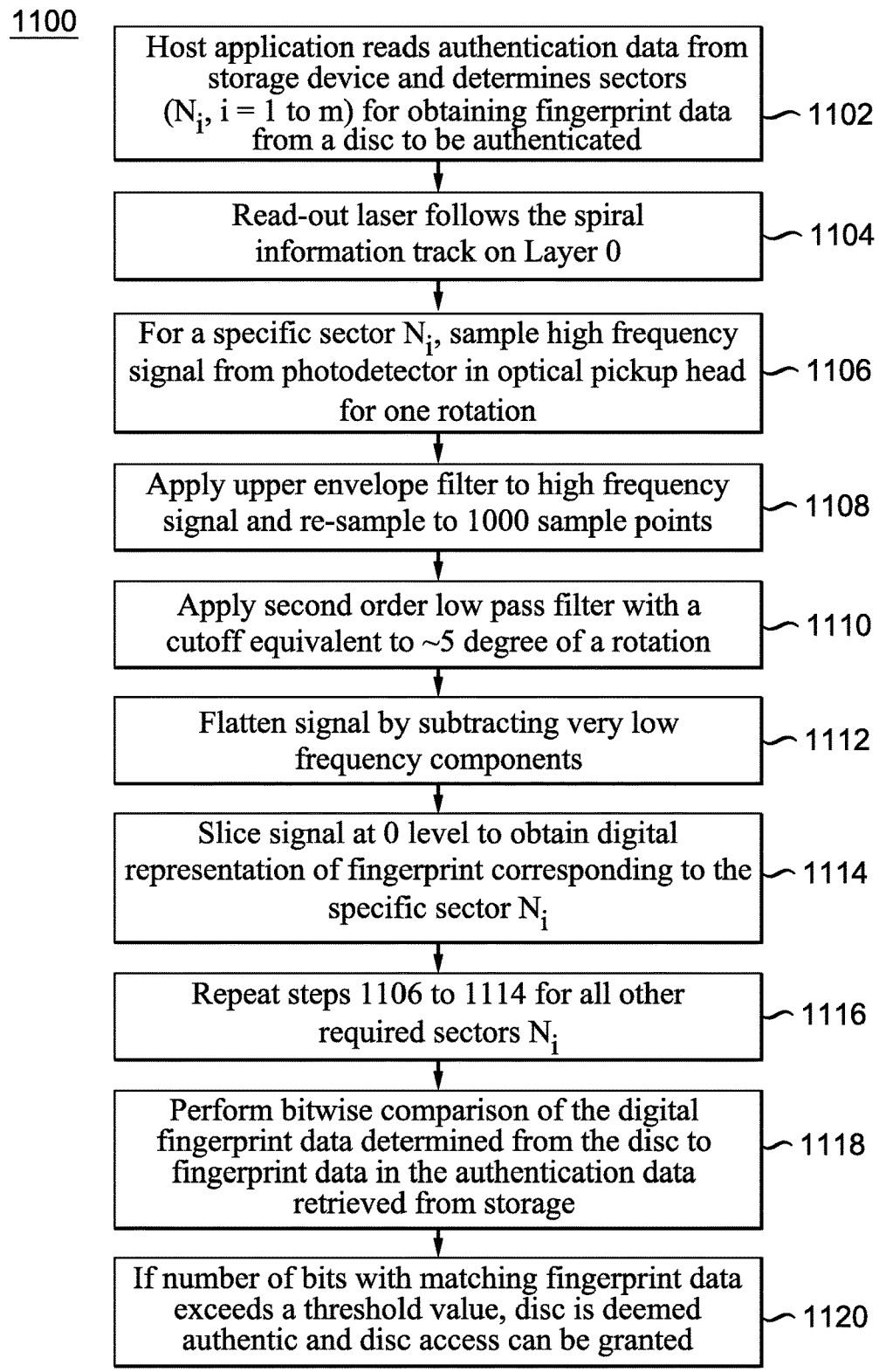
FIG. 11 illustrates a method of authenticating an optical disc using digital fingerprint data according to an embodiment of the present principles.

FIG. 11 illustrates a method 1100 of authenticating an optical disc based on derived from the disc fingerprint data (i.e., or interferometric pattern) obtained in accordance with the method 1000 of FIG. 10a according to one embodiment of the present principles. At step 1102, retrieval of the fingerprint data (e.g., the interferometric authentication) data occurs. As discussed, such data can reside on the disc itself or in a storage device external to the disc. From the authentication data, a determination is made regarding, which sectors will serve to obtain authentication data based on optical interference. For example, a number of sectors "n" at specific locations of the disc can be identified by individual sector identifiers $N_i$, with an index i (integer) running from 1 through n, where n is a positive integer. Note that the number of sectors used for disc authentication can be equal to or less than the number of sectors for which authentication data are available, i.e., previously determined and stored. In other words, "n" in method 1100 may be less than or equal to "m" in method 1000.

During step 1104, the read-out laser follows follow the spiral information track on Layer 0 of the disc undergoing authentication. During step 1106, for a specific sector $N_i$, the a photodetector in the optical pickup head samples a high frequency signal for one rotation of the disc. During At step 1108, an upper envelope filter is applied to the high frequency signal and re-sample to 1000 sample points. The resampled signal undergoes a second order low pass filtering during step 1110, with a cutoff equivalent to ~5 degree of a rotation. The signal then undergoes flattening during step 1112 by subtracting very low frequency components. During step 1114, the signal is sliced at 0 level to obtain a digital representation of a fingerprint or interferogram corresponding to the initial sector number. During step 1116, the signal processing steps 1106 to 1114 repeat for all other sector $N_i$ for which required authentication data. During step 1118, a bit-wise comparison occurs between the digital fingerprint data (i.e., digital representation of the interferogram) determined from the disc at the user's side and fingerprint data from the authentication data retrieved from storage. In other words, one or more bits of the digital fingerprint data from the disc undergo comparison with the corresponding bits of the digital fingerprint data from the authentication data retrieved from storage.

During step 1120, a determination of disc authenticity occurs based on the result of the comparison at step 1118. For example, a threshold number of bits ("X") can serve as a criterion for determining authenticity, such that if the bitwise comparison shows that the number of bits with correctly matching fingerprints exceeds the threshold value, then the disc is deemed to be authentic. Otherwise, if authentication fails, access to the disc is denied.

Although specific examples are presented above for dual-layer and single-layer pre-recorded BDs and DVDs, the authentication technique of the present principles can readily apply to other multi-layer data disc formats, including, for example, disc formats having three or more data layers, as well as to write-once or re-writable recordable disc formats.

While the forgoing is directed to various embodiments of the present principles, other and further embodiments of the invention may be devised without departing from the basic scope thereof. As such, the appropriate scope of the invention is to be determined according to the claims, which follow.

The invention claimed is:

1. A method for disc authentication, comprising:
   directing light through a light-transmissive first disc surface towards at least a first data layer;
   detecting optical interference pattern arising from light reflected from one data layer interfering with light reflected from at least one of the first disc surface and another data layer; and
   authenticating the disc based on the detected optical interference pattern.

2. The method of claim 1, wherein authentication of the disc is performed by comparing information obtained from the detected optical interference pattern with authentication data associated with the disc.

3. The method of claim 2, wherein the authentication data varies with one of a layer or substrate thickness variation on the disc.

4. The method of claim 1 wherein the authentication data is stored in at least one of: a burst cutting area of the disc, a recordable region of the disc, a memory device attached to the disc, a data storage device external to the disc, and at a storage location remote from the disc.

5. The method of claim 4 wherein the burst cutting area conforms to burst cutting area one of a Blu-ray disc or Digital Video Disc.

6. The method of claim 4 wherein the burst cutting area has a custom size.

7. The method of claim 4 wherein the burst cutting area has a non-standard location.

8. The method of claim 1, wherein the disc has at least first and second data layers, and the detected optical interference pattern includes intensity modulations arising from interference between the light reflected from the at least first and second data layers.

9. The method of claim 1, wherein the disc has a first data layer, and the detected optical interference pattern includes intensity modulations arising from interference between the light reflected from the first data layer and the first disc surface.

10. The method of claim 9, wherein the optical interference pattern is associated with one of a layer or substrate thickness variations of the data disc.

11. The method of claim 1, wherein the first disc surface comprises a read-out surface of the disc.

12. The method of claim 11, wherein the thickness variations are associated with at least one of a cover layer of a single-layer disc, a disc substrate of a single-layer disc, and a spacer layer of a dual-layer disc.

13. A method of providing a disc with authentication data, comprising:
   detecting an optical interference pattern arising from light reflected from a one data layer interfering with light reflected from at least one of a disc surface and another data layer on the disc;
   deriving authentication data from the measured optical interference pattern; and
   writing the authentication data to a memory.

14. An apparatus, comprising:
   a photodetector configured for detecting light signals reflected from a data disc; and
   at least one processor configured to process detected light signals and generate data based on light intensity modulations arising from light reflected from a first data layer interfering with light reflected from at least one of a read-out surface and a second data layer of the data disc;
   wherein the at least one processor is further configured to perform at least one of (1) storing the generated data for use as authentication data for the data disc, and (2) comparing the generated data with predetermined authentication data for authenticating the data disc.

* * * * *